ically shaping the metal to form various structural elements. For comparative purposes, commercially available metal decorating systems employing aqueous compositions have been tested and have been

United States Patent [19]
Martorano et al.

[11] 4,020,219
[45] Apr. 26, 1977

[54] METAL DECORATING METHOD INVOLVING MECHANICAL SHAPING

[75] Inventors: Richard Martorano, Marlton, N.J.; William H. Brendley, Jr., Hatboro; Thomas H. Haag, Feasterville, both of Pa.

[73] Assignee: Rohm and Haas Company, Philadelphia, Pa.

[22] Filed: Nov. 27, 1974

[21] Appl. No.: 527,791

Related U.S. Application Data

[63] Continuation-in-part of Ser. No. 377,685, July 9, 1973, abandoned, which is a continuation of Ser. No. 130,808, April 2, 1971, abandoned.

[52] U.S. Cl. .................................. 428/460; 72/46; 427/388 B; 428/461; 428/463
[51] Int. Cl.$^2$ .................. B32B 15/08; B21C 23/22
[58] Field of Search .................. 428/461, 460, 463; 260/29.4 UA, 39 R, 39 P; 427/388 B; 72/46

[56] References Cited

UNITED STATES PATENTS

| | | | |
|---|---|---|---|
| 2,670,341 | 2/1954 | Joffe | 428/460 |
| 2,760,886 | 8/1956 | Prentiss | 428/461 |
| 2,918,391 | 12/1959 | Hornibrook | 260/848 |
| 3,033,811 | 5/1962 | Brown | 260/29.4 UA |
| 3,082,184 | 3/1963 | Falgiatore | 428/461 |
| 3,238,167 | 3/1966 | Wolff | 428/460 |
| 3,245,932 | 4/1966 | Glavis | 260/29.4 UA |
| 3,382,294 | 5/1968 | Christenson | 428/461 |
| 3,661,827 | 5/1972 | Taft | 260/29.6 R |
| 3,671,293 | 6/1972 | Walle | 428/460 |

FOREIGN PATENTS OR APPLICATIONS

| | | | |
|---|---|---|---|
| 551,864 | 1/1958 | Canada | 260/29.4 UA |
| 676,155 | 12/1963 | Canada | 260/29.4 UA |

OTHER PUBLICATIONS

N. Nakajima, "Fractionation of Linear PE with GPC," Adv. in Chem. Series, 125, Amer. Chem. Soc., Wash. D. C., pp. 98–107, 1973.

Primary Examiner—Ellis P. Robinson

[57] ABSTRACT

Aqueous resinous compositions having an alkaline pH for application to metal sheets and curing the same prior to shaping the metals to achieve metal decoration are disclosed. By "decorating" is meant applying synthetic resinous coatings to the metal followed by a severe mechanical forming operation such as the formation of screw-threaded bottle caps. The composition is thermosettable and comprises (A) an addition copolymer of certain monomers and (B) a water-soluble urea-formaldehyde reaction product or a water-soluble methanor or ethanol ether thereof. The copolymer contains small amounts of carboxyl and amide and/or hydroxyl functionality. The weight ratio of (A) to (B) is from 35:65 to 65:35, and the solids content is between 40 and 80 percent. The coating composition has properties which similar previously known aqueous compositions lack, an important one being that the composition may be direct-roller coated onto the substrate without fouling the coating roller with a partially dried accumulation of the coating composition. The coated panels having a wet coating may be placed directly in the curing oven without blistering, avoiding the necessity of a preliminary low temperature drying step and freedom from patterning. The proportions of functional monomers are critical as are the ratios of the addition copolymer to the urea-formaldehyde adduct. Other critical properties are the minimum film-forming temperature (MFT) of the composition which can be no higher than about 15° C. and the glass transition temperature (Tg) of the addition copolymer which must be below 0° C., preferably below −15° C.

11 Claims, No Drawings

METAL DECORATING METHOD INVOLVING MECHANICAL SHAPING

This application is a continuation-in-part of Ser. No. 377,685, filed July 9, 1973, which in turn is a continuation of application Ser. No. 130,808, filed Apr. 2, 1971, both of which are now abandoned.

This invention is related to Ser. No. 527,792, filed Nov. 27, 1974 which is a division of Ser. No. 377,685. Ser. No. 527,792 concerns the composition of the present application, and has now issued as U.S. Pat. No. 3,962,167.

This invention concerns metal decorating and thermosetting coating compositions which are applied from aqueous media to the surface to be coated. By "metal decorating" is meant coating a metal sheet then subjecting it to a mechanical forming process. An example is the manufacture of bottle caps from previously coated stock. Particularly it concerns thermosetting coating compositions which can be applied to primed or unprimed metal surfaces from aqueous media to provide coatings which exhibit excellent hardness, toughness, resistance to abrasion, and outstanding adhesion. More particularly, it concerns thermosetting coating compositions which can be applied from aqueous media to unprimed metal surfaces to provide primer coats which exhibit, when baked, excellent water-resistane and solvent-resistance, high adhesion to the unprimed metal surface, and have high hardness, toughness and resistance to abrasion. A most important goal is to provide a composition, which can be used on metal sheets which are subsequently mechanically formed, and which can be coated by a direct-roller coating process.

This invention also concerns pigmented thermosetting coating compositions which can be applied from aqueous media to the surfaces to be coated.

Heretofore metals have been protected from corrosion by the application of primers comprising certain corrosion-protective pigments in non-aqueous vehicles based on a drying oil, such as linseed oil, a fast-drying varnish base comprising natural resins, or a mixture of natural and synthetic resins, or an alkyd base modified with a urea-, melamine-, or phenol-formaldehyde resin. Such coating compositions contain volatile solvents frequently of inflammable character and often of a type which gives off noxious fumes during the coating operation. To cope with the fire and health hazards, protection is usually provided in the way of solvent recovery systems.

Butadiene-styrene latices have also been used as vehicles for coating compositions but exhibit the disadvantages which are generally associated with unsaturated polymers, i.e., they progressively embrittle and gradually discolor because of continued oxidation.

Because of the desirable properties of thermosetting coating compositions and because water is an inexpensive, readily available, non-inflammable, non-toxic and odor-free medium, there has long been a demand for thermosetting coating compositions which can be applied from aqueous media.

Earlier aqueous systems such as are shown in U.S. Pat. No. 2,760,886 to Prentiss et al, U.S. Pat. No. 2,918,391 to Hornibrook et al, and U.S. Pat. No. 3,033,811 to Brown et al have not proved wholly satisfactory for coating metals for uses according to the present invention by direct-roller coating machinery because they tend to dry on the roller causing difficulties in cleanup, or blister when the wet products are put directly in an oven, or are not amenable to severe postforming operations because of brittleness or to handling because of softness, or will not flow well, or have other disadvantages.

The thermosetting coating compositions of the invention provide, after baking, clear or pigmented coatings which possess excellent water- and solvent-resistance, excellent adhesion to a variety of substrates, high gloss, which do not exhibit cold flow or become tacky at elevated temperatures, and most importantly can be applied by direct-roller processes to metals to provide films with good appearance which can be post-formed.

The coating compositions of the invention comprise an alkaline aqueous blend having a binder consisting essentially of:

A. a latex of a water-insoluble addition copolymer of (1) a monovinyl aromatic monomer, (2) at least one ester of acrylic or methacrylic acid, (3) an olefinically unsaturated monomer having at least one of an amide and a hydroxyl group, and (4) an olefinically unsaturated monomer having a carboxyl group, the amount of (3) being from 1.5 to 5 percent and the amount of (4) being from .5 to 2 percent, based on the total weight of monomers, the Tg of the copolymer being below 0° C., and B. a water-soluble urea-formaldehyde reaction product or a water-soluble methanol or ethanol ether thereof, the weight ratio of A to B on a solids basis being from 35:65 to 65:35, the minimum film-forming temperature of the composition being no higher than about 15° C., and the solids content of the composition being between 40 and 80 percent.

Desirably, B is the reaction product of a urea-formaldehyde adduct with methanol, the mole ratio of urea:formaldehyde:methanol being in the range of 1/1.75–3/2–3.5, (1) is styrene or vinyltoluene, (2) is an ester of at least one of acrylic acid and an alkanol having from about 2 to 12 carbon atoms, or an ester of methacrylic acid and an alkanol having from about 6 to 14 carbon atoms, (3) is at least one of methacrylamide, acrylamide, hydroxyethyl acrylate or methacrylate, or hydroxypropyl acrylate or methacrylate, and (4) is acrylic acid, methacrylic acid, or itaconic acid, and the Tg of the copolymer is below −15° C. The preferred weight ratios of monovinyl aromatic/acrylic ester/amide-containing or hydroxyl-containing monomer, or both/unsaturated acid is in the range of 40–50/50–60-/1–3/1–2, the total being from 92 to 115. Most preferred for A is a copolymer of styrene, butyl acrylate, at least one of hydroxyethyl methacrylate and methacrylamide, and methacrylic acid in the same weight ratios. For best results, the composition should contain a volatile base, a tertiary amine being preferred.

One of the monomers utilized in a substantial proportion to prepare the addition copolymer is a flexibilizing or "soft" monomer which may be represented by the following formula:

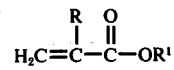

wherein R is H or alkyl having 1 to 4 carbon atoms and R$^1$ is the straight chain or branched chain radical of a primary or secondary alkanol, alkoxyalkanol or alkylthiaalkanol, the alkanol having from 2 to about 14 carbon atoms, the chain length depending upon the identity of R, examples being ethyl, methylpropyl, n-butyl, 2-ethylhexyl, hepthyl, hexyl, octyl, propyl, 2-methylbutyl, 1-methylbutyl, butoxybutyl, 2-methylpentyl, methoxymethyl, ethoxyethyl, cyclohexyl, n-hexyl, isobutyl ethylthiaethyl, methylthiaethyl, ethylthiapropyl, n-octyl, 6-methylnonyl, decyl, dodecyl, and the like. When R is alkyl and $R^1$ is alkyl, $R^1$ should have from about 6 to about 14 carbon atoms and when R is H and $R^1$ is alkyl, $R^1$ should have from 2 to about 12 carbon atoms, in order to qualify as a soft monomer.

Important properties of the copolymer are its toughness and flexibility, as well as its influence upon the minimum film-forming temperature (MFT) of the coating composition. The glass transition temperature (Tg) of the copolymer and consequently the selection of monomers and proportions thereof depends upon their influence on the Tg. The Tg of the polymer must be below 0° C. and is preferably below −15° C. "Tg" is a conventional criterion of polymer hardness and is described by Flory, "Principles of Polymer Chemistry," pp. 56 and 57, (1953), Cornell University Press. While actual measurement of the Tg is preferred, it may be calculated as described by Fox, Bull. Am. Physics Soc. 1, 3, p. 123, (1956). Examples of the Tg of homopolymers and the inherent Tg of homopolymers and the inherent Tg thereof which permits such calculations are as follows:

| Homopolymer of | Tg |
| --- | --- |
| n-octyl acrylate | −80° C. |
| n-decyl methacrylate | −60° C. |
| 2-ethylhexyl acrylate | −70° C. |
| octyl methacrylate | −20° C. |
| n-tetradecyl methacrylate | −9° C. |
| methyl acrylate | 9° C. |
| n-tetradecyl acrylate | 20° C. |
| methyl methacrylate | 105° C. |
| acrylic acid | 106° C. |

There or other monomers are blended to give the desired Tg of the copolymer. As is known, for a given number of carbon atoms in the alcohol moiety, the extent and type of branching markedly influences the Tg, the straight chain products giving the lower Tg.

The coating composition of the invention similarly has a critical maximum MFT of 15° C. MFT is determined by the method described in Resin Review, Vol. 16, No. 2 (1966). This is influenced not only by the Tg of the addition copolymer, but by the plasticizers or coalescing agents used and their amounts. At MFT values appreciably above this maximum, difficulties in obtaining a uniform coating film and lack of film integrity during deformation of the metal are encountered.

In addition to the flexibilizing monomer, the other essential monomers are the "toughening" "hard" monomers, including the monovinyl aromatic monomer, the unsaturated acid monomer, and the monomers having hydroxyl and/or amide functionality. The hardness or softness of the acid and other functional monomers is not critical because of the small amounts used. Styrene and vinyltoluene are examples of the monovinyl aromatics.

The unsaturated carboxylic acid may be a simple monocarboxylic acid, or may be a half ester or half amide of an $\alpha,\beta$-unsaturated dicarboxylic acid, and salts thereof with a volatile base such as ammonia, or with a volatile water-soluble amine such as dimethylamine, triethylamine, triethanolamine, morpholine, N-methyl morpholine, picoline, and the like. Examples of copolymerizable ethylenically unsaturated monocarboxylic or polycarboxylic acids are sorbic, cinnamic, vinyl furoic, α-chlorosorbic, p-vinylbenzoic, acrylic, methacrylic, maleic, fumaric, aconitic, atropic, crotonic, and itaconic acid, or mixtures thereof, with itaconic acid and the $\alpha,\beta$-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate, and butyl acid maleate. Such partial esters and partial amides are considered to be "$\alpha,\beta$-unsaturated monocarboxylic acids," and the term as used herein includes such esters and amides.

In addition to the acids, also present are an amide-containing monomer such as acrylamide, methacrylamide, or the methylol or methoxymethylol derivatives thereof, or a hydroxyl-containing monomer such as hydroxyethyl or hydroxypropyl acrylate or methacrylate. The hydroxyl-containing and amide-containing monomers may be used together, or singly.

Other ethylenically unsaturated copolymerizable monomers optionally present and having a Tg of above 0° C. are useful in combinations with the above mentioned flexibilizing monomers and toughening monomers provided they do not adversely affect the desired properties of the copolymer (e.g., unduly raise the overall Tg). These may be represented by the formula:

wherein R is as above. $R^2$ is preferably alkyl and is methyl or alkyl having from about 13 to about 20 carbon atoms when R is H, and is alkyl of from 1 to about 5 carbon atoms or alkyl of from about 15 to about 20 carbon atoms when R is methyl. It can be seen from about that for alkyl acrylates and alkyl methacrylates the Tg at first decreases with an increased chain length of the alkyl group and then the Tg again increases; i.e., both hard and soft monomers are known to occur in each group of monomers. Examples of these hard monomers and other hard monomers include: methyl acrylate, vinyl acetate, tetradecyl acrylate, pentadecyl acrylate, methyl methacrylate, ethyl methacrylate, t-butyl acrylate, butyl methacrylate, and pentadecyl methacrylate.

The coating compositions described hereinbefore may be used as a clear top coating or may be pigmented with a variety of pigments as set forth hereinafter.

If it is desired to increase the viscosity of these coating compositions, they may be readily thickened with a variety of water-soluble gums. Said water-soluble gums must not be reactive with the other components of the coating composition at room or slightly elevated temperatures, but it is preferred that they decompose at the baking temperatures employed to yield volatile materials which leave the film and/or residues which are water-insoluble or which can undergo reaction with the other components of the composition and thus become water-insolubilized. Thus, the ammonium or lower amine salts of polycarboxylic acids are suitable, and typical examples are ammonium polyacrylate, ammonium polymethacrylate, the salts of polyacrylic and polymethacrylic acids with mono-, di-, and trimethylamine, the salts of polyacrylic and polymethacrylic acids with mono-, di-, and triethylamine, and the ammonium and lower amine salts of the copolymers obtained by polymerizing styrene and maleic anhydride and methylvinyl ketone and maleic anhydride. Certain cellulose derivatives are also suitable such as methyl cellulose, ammonium carboxymethyl cellulose, and hydroxyethyl cellulose.

The water-soluble, heat-convertible urea-formaldehyde reaction products and/or their derivatives obtained by reaction with ethanol or methanol can be prepared according to one of the following schemes: (1) control of reaction conditions so that the degree of polymerization is kept very low, even to the monomeric stage, and (2) introduction of hydrophilic groups into the molecules of the polymeric condensates. Thus, they can be made by careful control of reaction conditions as set forth in Schildknecht, "Polymer Processes," Vol. X, page 295 et seq. (Interscience Press, 1956). The preparation of another class of compounds suitable in the present invention, such as, N,N'-bis-(methoxymethyl)urea is set forth in Bull. Chem. Soc. Japan, Vol. XI, No. 3,239 (1936).

The preferred embodiments of this invention, particularly with combinations which give hard films after baking, employ materials which are designated as "coalescents." These coalescents aid fusion of the film during air-drying prior to baking. These coalescents also promote the flow of coating composition during the baking cycle, but do not form a part of the finished coating. They are characterized by being low in water-solubility, good solvents for the uncured polymer mixture, less volatile than water so that they remain in the film after the water has evaporated, sufficiently volatile that they are removed from the film before the end of the baking cycle, and not susceptible to hydrolysis in alkaline media either at ambient or elevated temperatures. Typical examples are isophorone (3,5,5-trimethylcyclohexene-2-one-1), 2-ethylhexanol, diacetone alcohol, dimethyl formamide, alkyl ethers of ethylene glycol and propylene glycol, and tributyl phosphate which are used in the amounts of 5 to 10 parts by weight on 100 parts by weight (solids basis) of the coating composition.

The preferred emulsion copolymer, having a molecular weight of between about 70,000 and 2,000,000, and preferably between about 250,000 and 1,000,000 is made by the emulsion copolymerization of the several monomers in the proper proportions. Conventional emulsion polymerization techniques are described in U.S. Pat. Nos. 2,754,280 and 2,795,564. Thus, the monomers may be emulsified with an anionic, a cationic, or a nonionic dispersing agent, about 0.05 percent to 10 percent thereof ordinarily being used on the weight of the total monomers. The acid monomer and many of the other functional or polar monomers may be soluble in water so that the dispersing agent serves to emulsify the other monomer or monomers. A polymerization initiator of the free-radical type, such as ammonium or potassium persulfate, may be used alone or in conjunction with an accelerator, such as potassium metabisulfite, or sodium thiosulfate. Organic peroxides, such as benzoyl peroxide and t-butyl hydroperoxide are also useful initiators. The initiator and accelerator, commonly referred to as catalyst, may be used in proportions of 0.1 percent to 10 percent each based on the weight of monomers to be copolymerized. The amount, as indicated above, may be adjusted to control the intrinsic viscosity of the polymer. The temperature may be from room temperature to 60° C. or more as is conventional.

Suitable dispersing agents useful in emulsion polymerization include anionic types such as the sodium salts of the higher fatty acid sulfates, such as that of lauryl alcohol, the higher fatty acid salts, as the oleates or stearates or morpholine, 2-pyrrolidone, triethanolamine or mixed ethanolamines, or any of the nonionic types, such as ethylene oxide-modified alkyl phenols, of which tert-octyl phenol modified by 20 to 40 ethylene oxide units is representative, ethylene oxide-modified higher fatty alcohols such as lauryl alcohol, containing 20 to 50 ethylene oxide units, similarly modified long-chain mercaptans, fatty acids, amines, or the like. Mixtures of nonionic and anionic dispersing agents are also useful. The preferred composition is prepared with a nonionic emulsifier or such emulsifier is added after polymerization.

The amounts of emulsifier or emulsifiers required vary primarily with the concentration of monomers to be handled and to a minor extent with choice of emulsifier, monomers, and proportions of monomer. Generally, the amount of emulsifying agent is between 2 percent and 12 percent of the weight of the mixture of monomers and is preferably 4 percent to 7 percent of this weight. If the dispersion is to contain a relatively low concentration of interpolymer somewhat more than the minimum emulsifying agent indicated by the above rule may prove desirable. In such case, the concentration of emulsifying agent is the aqueous solution may desirably be at least 1 percent of this solution and may be as much as about 7 percent of the weight of the aqueous solution thereof.

As the addition polymerization catalyst there may be used one or more peroxides which are known to act as free-radical catalysts and which have solubility in aqueous solutions of the emulsifier. Highly convenient are the persulfates, including ammonium, sodium and potassium persulfates or hydrogen peroxide or the perborates or percarbonates. There may also be used organic peroxides, either along or in addition to an inorganic peroxidic compound. Typical organic peroxides include benzoyl peroxide, tert-butyl hydroperoxide, cumene peroxide, tetralin peroxide, acetyl peroxide, caproyl peroxide, tert-butyl perbenzoate, tert-butyl diperphthalate, methylethyl ketone peroxide, etc. The preferred organic peroxides have at least partial solubility in the aqueous medium containing the emulsifying agent. Choice of inorganic or organic peroxidic catalyst depends in part upon the particular combination of monomers to be interpolymerized, some of these responding better to one type than the other.

The amount of peroxidic catatyst required is roughly proportional to the concentration of the mixture of monomers. The usual range is 0.01 percent to 3 percent of catalyst with reference to the weight of the monomer mixture. The preferred range is from 0.05 percent to 0.5 percent, while the range of 0.1 percent to 0.25 percent is usually best. The optimum amount of catalyst is determined in large part by the nature of the particular monomers selected, including impurities which accompany particular monomers.

Another suitable class of free-radical generating compounds are the azo catalysts. There may be used, for example, azodiisobutyronitrile, azodiisobutyramide, azobis($\alpha,\alpha$-dimethylvaleronitrile), azobis($\alpha$-methylbutyronitrile), dimethyl, diethyl, or dibutyl azobis(methylvalerate). These and other similar azo compounds serve as free-radical initiators. They contain an —N=N— group attached to aliphatic carbon atoms, at least one of which is tertiary. An amount of 0.01 percent to 2 percent on the weight of monomer or monomers is usually sufficient.

In order to effect interpolymerization at a temperature below that at which coagulation might occur, it may be desirable to activate the catalyst. This may best be accomplished by using a so-called redox system in which a reducing agent is present in addition to the peroxidic catalyst. Many examples of such systems are known. Agents such as a soluble sulfite, including hydrosulfites, sulfoxalates, thiosulfates, sulfites, and bisulfites can be used. Examples of these are sodium hydrosulfite, sodium metabisulfite, potassium sulfite, zinc formaldehyde-sulfoxalate, and calcium bisulfite. Tertiary amines may also be employed. Redox systems may be activated by the presence of a small amount of polyvalent metal ions. Ferrous ions are commonly and effectively thus used, a few parts per million being sufficient.

The amounts of reducing agent required vary somewhat with the choices of peroxide initiator, reducing activator or agents, and metal promoter, if used, also with the choice of emulsifying agent, and with the particular monomers involved. Within the limits of about 0.5 percent to 6 percent with reference to the weight of the mixture of monomers will be found the amount of reducing agent for practically any system. The preferred amounts of sulfite agent or equivalent fall in the range of 0.2 percent to 1 percent.

Copolymerization is best effected below about 80° C. A preferred range is 15° to 70° C., although slightly lower and somewhat higher temperatures are permissible. After most of the monomers have been converted to interpolymer, temperatures even higher than 80° C. may then be applied. In fact, after most of the monomers have interpolymerized, the resulting dispersion can be heated to boiling without breaking the dispersion. During interpolymerization, the temperature can be controlled in part through the rate at which monomers are supplied and interpolymerized and/or through applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. An advantage of gradual addition of monomers lies in reaching a high solids content with optimum control and with maximum uniformity of product. Additional catalyst or additional components of the redox system may also be added as polymerization proceeds.

Since it is desired to have the mixture of the acrylic dispersion and the aminoplast stable on prolonged storage, and since the aminoplast is reactive under acid conditions, the mixture must be made alkaline. A volatile base, such as ammonia or a tertiary amine as discussed above in connection with acidic monomer salts, is used to make the system alkaline because tertiary amines will not react with the formaldehyde associated with the aminoplast. The tertiary amines also function as corrosion inhibitors when the coating compositions of the present invention are used for coating metal. The tertiary amine must be sufficiently volatile that it will be driven from the film during the baking operation. However, it must not be so volatile that it "flashes" from the film or gasifies if the coating composition is applied by spraying. Particularly preferred because of the balance of properties, availability and economy is triethylamine. The pH of the mixture should be maintained in the range of 9 to 11 in order to ensure good storage stability. However, it is apparent that initial pH control alone is not sufficient to insure adequate stability and retention of properties since samples neutralized to the desired pH range with ammonia have inadequate stability on prolonged storage, although satisfactory films are obtained if the ammonia-neutralized compositions are used shortly after preparation. However, if the tertiary amine is the predominant nitrogen base present, small amounts of ammonia can be used without deleterious effects. The amounts of amine used will vary depending on the specific composition employed but will be in the range of 1 to 5 parts by weight per 100 parts by weight of coating composition (solids basis). A preferrred embodiment employs two parts by weight per 100 parts by weight of the coating composition (solids basis).

When pigments are employed, it is essential to employ a dispersant. While a wide variety of dispersants will satisfactorily disperse pigments, the effect of the dispersant on the properties of the final film must be considered. Many dispersing agents remain in the final film unchanged, thus seriously impairing the water-resistance of the film. Other dispersing agents will adversely affect the stabilities of the systems into which they are incorporated.

A preferred embodiment employs as dispersants the ammonium and lower amine salts of polymeric carboxylic acids. Thus, the ammonium and lower amine salts of polyacrylic and polymethacrylic acids and similar salts of the polymeric acid obtained by copolymerizing methyl vinyl ether with maleic anhydride are suitable. A particularly preferred embodiment employs the ammonium half amide salt or the diammonium salt of a diisobutylene-maleic anhydride copolymer having a number average molecular weight of from about 2,000 to about 4,000. The amount of dispersant employed will vary depending on the amount and nature of the pigments used and the amount and nature of the composition employed as binder. Generally, however, from about 0.3 to about 3.5 parts by weight (solids basis) per 100 parts by weight of pigment, will prove to be effective for dispersing the pigment.

It appears that the dispersants of the type hereinbefore described decompose at the temperature employed in the baking cycle to liberate ammonia or lower amine which is then volatilized. It is further postulated that the carboxylic residuals react either with the amide group of the copolymer or with the aminoplast or both to become insoluble. Regardless of the mechanism involved, the fact that it is observed that this particular class of dispersants, when employed as set forth hereinbefore, do not detract from the excellent water-resistance and other highly desirable properties of the films proves that such catalysis does occur. It has been proven that even clears which contain a small amount of such dispersants exhibit better water- and solvent-resistances than do the same compositions without dispersant, both samples being cured under exactly the same conditions. The amount of dispersant employed in clears varies depending on the amount of aminoplast employed. From about 0.1 to about 1.0 part by weight dispersant per 100 parts by weight (solids basis) of the coating composition will effect the desired catalysts.

The coating compositions of the present invention may, as set forth hereinbefore, be employed as clears, i.e., non-pigmented coatings, or as pigmented coatings. If pigmented, the ratio of pigments to coating to solids may be varied widely, depending on the pigment employed and the specific application involved. Thus, the ratio of pigment to coating solids may vary from 1 to 20 to 20 to 1. The clears are particularly useful as "overcoats," i.e., the so-called overprint coatings which are used to protect decorative undercoats without detracting from the decorative effect. Because the clear coatings of the present invention exhibit good clarity, high gloss, excellent solvent- and water-resistance, and high adhesion to a variety of surfaces, they are admirably suited for use as overprint finishes.

The coating compositions of this invention can be applied to a variety of substrates, the only restriction being the ability of the substrate to withstand the baking cycle which is essential in the processing of said coating compositions. Metals are particularly suitable, whether prime-coated or unprimed. Thus, iron, steel, chrome-plated steel, tinplated steel, aluminum, copper, bronze, or brass surfaces, particularly in sheet or coil form with thicknesses of 0.05 to 0.20 inches, prove to be excellent as substrates for the coating compositions of the present invention. Ceramic surfaces and, in some instances, wood surfaces, are also suitable as substrates. The thickness of the cured coating being 0.05 to 5 mils.

A wide variety of pigments can be employed with the coating compositions of the present invention. The pigments employed, however, must be stable and non-reactive under alkaline conditions, i.e., a pH from about 9 to about 11. Typical pigments which are suitable include titanium dioxide, iron oxide, calcium carbonate, barytes and numerous types of clays.

The coating compositions can be applied by suitable means or equipment, such as with spray guns, with brushes, or rollers, or by dipping, and suprisingly by direct-roller coating, i.e., a single roller applies the coating to the substrate while rotating in a pool of the cooling composition. Most aqueous systems must be reverse roller coated because of fouling of the roller, patterning, and poor flow and leveling occur if direct roller coating is attempted, but it is essential that they be baked at elevated temperatures. One embodiment involves the addition of a coalescent to the composition before application to the substrate, and allowing said coated substrate to air-dry at room or slightly elevated temperature. This is not necessary, however, because the present invention provides products which do not blister when a coated product is put in the oven while wet. The air-drying cycle, if used, should be continued until the film, either clear or pigmented, is substantially free from water. The baking or curing operation volatilizes all the volatile material in the film including any remaining water, traces of monomer, coalescents, and the tertiary amine. It is particularly important that the tertiary amine be volatilized since it inhibits the cure of the aminoplast. The baking operation effects the decomposition of the ammonium or amine salts of the polymeric carboxylic acids, apparently releasing the acid form of the copolymer which may then react with the other components to become insoluble. The baking operation causes the cure of the aminoplast which crosslinks and insolubilizes the entire film. Depending on the specific composition being used, the baking temperature may vary from 250° to about 350° F. Baking times will vary from about 45 minutes to about 30 seconds.

When applied to an Alodine aluminum (Q Panel 612, MIL-C-5441, 0.025 inch thick) dried, the dry film being 1 mil in thickness, and baked for 60 seconds at 500° F., the coating of the invention endures when subjected to the conventional 1-T bend, 2-T bend, 8 inch-pound direct impact, and 22 inch-pound reverse impact tests.

In each of the examples, the panel coated with the wet coating was inserted directly into the oven for 10 minutes at 325° F. and then the panels were given the hot-stack test described below and were given fabrication tests, dry-heat tests, and processing tests. In each of these tests, the metal sheet, in the form in which it comes out of the 325° oven, is formed into bottle caps as are such sheets or panels which have been rebaked or overbaked for 10 minutes at 400° F. and others which have been rebaked or overbaked for 30 minutes at 400° F. The series of fabrication tests on each of the three types of sheets involves forming screw-top bottle caps and determining top cracking or knurl failure on the outside of the cap and on the inside of the cap, determining body, base, lip, or ridge failure or defects. Caps formed from the same three panels are subjected to dry-heat treatment for 10 minutes at 400° F. followed by an examination to determine cracking or failure of the coating in the body, base, lip, or ridge areas. These same three panels are formed into caps which are subjected to the processing test, i.e., steam at a gauge pressure of 15 psig. or 250° F. for 1 hour. Again the coating in the body, base, lip, and ridge areas is examined for defects.

EXAMPLE 1

An emulsion copolymer latex of styrene/butyl acrylate/methacrylamide/methacrylic acid in the weight ratios of 42/54/2.5/1.5 is blended with a water-soluble urea-formaldehyde adduct modified by reaction with methanol, the mole ratio of urea/formaldehyde/methanol being 1:2.5:3, the weight ratio of the copolymer to the adduct being 60:40 and with 2 percent, by weight of the liquid blend, of triethylamine to give a total solids content of 60 percent and a pH of 9.0.

Ball mill grinds were prepared from the following formulation, parts being by weight: 45 parts DuPont Rutile R-960 pigment, 45 parts of the blend described above, 10 parts solvent (water/butyl Cellosolve in the ratio of 1/1), 0.75 percent pigment dispersant, 0.5 percent wetting agent, 0.5 percent defoamer. The mixture is ball milled for 48 hours. This gave a solids content of 54 percent.

For the clear coating, the blend of the urea-formaldehyde adduct and latex is simply diluted to 45 percent total solids with the same solvent, and 1 percent by weight of a wetting agent is included in the composition. In this and the following examples, equivalent results are obtained using various methods of applying the wet coating, including direct-roller coating (Union Tool No. 5) at 150 feet per minute with rollers of neoprene rubber or polyurethane, to give a dry-film thickness of 0.2 to 0.4 mils on both the dried coatings.

The pigmented coating is applied to 90 pound tin-plated steel and to anodized aluminum 0.025 inch sheet in thickness, the panels are baked for 10 minutes at 325° F., a wet ink is applied, and the clear overprint varnish immediately applied over the wet ink and baked at 325° F. for 10 minutes.

EXAMPLE 2

The above is repeated but with a latex prepared by emulsion polymerization of styrene/butyl acrylate/hydroxyethyl methacrylate/methacrylic acid/43/54/1.5/1.5.

EXAMPLE 3

The foregoing are repeated with a latex polymer prepared by emulsion methods containing styrene/butyl acrylate/methacrylic acid in the ratio of 44.5/54/1.5.

These are then tested for gloss, for hot-stacking to determine whether cured coatings would stick to one another or to bare metal, tested for fabrication by forming into screw caps for bottles with a baking schedule including rebaking the panels for 10 minutes at 400° F. and for 30 minutes at 400° F. The caps formed from the panels are then subjected to dry heat for 10 minutes at 400° F. Another batch of the caps prepared from the panels are subjected to heating for 1 hour with steam under pressure with the gauge pressure being 15 pounds and the temperature 250° F.

The gloss of the base-white coat of Examples 1, 2, and 3 is comparable at an angle of 60° in the gloss reading device. At 20°, the gloss of Examples 2 and 3 is slightly better than that of Example 1. The hot-stacking test shows Example 1 to be slightly superior to Example 2, Example 3 being markedly inferior to the products of the other examples. In the test wherein a panel is rebaked and then formed into bottle screw caps, all three products are comparable except that there is slight knurl failure in the products of Examples 1 and 2, and the caps of Example 3, after steam processing, are water spotted and blistered.

After the clear coating is applied over the baked pigmented coating and baked for 10 minutes at 325° F., the hot-stack results showed the product of Example 1 to be markedly superior to the other two, and that of Example 2 superior to that of Example 3, which was unacceptable. After being subjected to overbaking or rebaking the panel of Example 3 at 400° F. for 30 minutes, caps formed therefrom appeared dull. The properties as far as top cracking, knurl failures, and defects in the body, base, lip, and ridge areas of the cap were generally comparable. Caps from the panel having received a 30 minute overbake at 400° F. of Examples 1 and 2 after being subjected to dry heat as described above, had a trace of cracking in the lip area. The product of Example 3 again failed the steam processing test, the products of Examples 1 and 2 being satisfactory after processing, in some cases with a few blisters or a slight wrinkling of the film, where the panel had been overbaked for 30 minutes. The caps of Example 3 were dull, rusted, and water spotted after processing. The remainder of the tests were comparable for the fabrication, dry heat, and processing tests.

EXAMPLE 4

As has been suggested heretofore, water-soluble melamine-formaldehyde reaction products cannot be substituted for the urea-formaldehyde adducts. The pigmented composition as prepared in Example 1 and the other compositions set forth below were applied to 90 pound tin plate as in Example 1. The melamine-formaldehyde product is a melamine-formaldehyde adduct modified by subsequent reaction with methanol, the mole ratios of melamine:formaldehyde:methanol being 1:7:12. A similar product to that of Example 1 was prepared and also one in which equal parts by weight of the urea-formaldehyde adduct and of the acrylic resin, on a solids basis, were used rather than the 40:60 adduct:resin ratio. The gloss of the melamine-formaldehyde was good but substantially below that of the other two products. The hot-stack test showed the melamine-formaldehyde to be the best as far as resisting blocking is concerned, the others being good to excellent, however. The melamine-formaldehyde-containing coating was inferior as far as base cracks and ridge cracts in caps formed after a single 10 minute bake at 325° F. Coatings on caps prepared from the panels overbaked at 400° F. using the melamine-formaldehyde product were unsatisfactory after the dry-heating test, and failed in the test wherein the cap is subjected to steam heat. The other two products were much superior, only trace cracking appearing on some areas of the cap for those made from panels which had been subjected to a 400° F. overbaking for 30 minutes.

We claim:

1. A method of decorating a sheet metal substrate comprising the steps of direct-roller coating said substrate with a pigmented or unpigmented thermosettable composition comprising an alkaline aqueous blend having a binder consisting essentially of:
   A. a latex of a water-insoluble addition copolymer obtained by emulsion polymerization a molecular weight of from 70,000 to 2,000,000 of (1) a monovinyl aromatic monomer, (2) at least one ester of acrylic or methacrylic acid, (3) at least one olefinically unsaturated monomer having an amide or a hydroxyl group, and (4) an olefinically unsaturated monomer having a carboxyl group, the amount of (3) being from 1.5 to 5 percent, and the amount of (4) being from 0.5 to 2 percent, based on the total weight of monomers, the Tg of the copolymer being below 0° C., and,
   B. a water-soluble urea-formaldehyde reaction product or a water-soluble methanol or ethanol ether thereof, the weight ratio of A to B on a solids basis being from 35:65 to 65:35, the minimum film-forming temperature of the composition being no higher than about 15° C., and the solids content of the composition being between 40 and 80 percent, curing and thermosetting said coating, and mechanically forming said sheet metal into articles of manufacture the final thickness of the coating being 0.05 to 5 mils.

2. The method of claim 1 in which B is a methyl ether of the urea-formaldehyde reaction product.

3. The method of claim 2 in which the mole ratio of urea:formaldehyde:methanol is in the range of about 1/1.75–3/2–3.5, the composition contains a nonionic emulsifier and a volatile base and said molecular weight is at least about 250,000.

4. The method of claim 3 in which (1) is styrene or vinyltoluene, (2) is an ester of at least one of acrylic acid and an alkanol having from about 2 to 12 carbon atoms, or an ester of methacrylic acid and an alkanol having from about 6 to 14 carbon atoms, (3) is at least one of methacrylamide, acrylamide, hydroxyethyl acrylate or methacrylate, or hydroxypropyl acrylate or methacrylate, and (4) is acrylic acid, methacrylic acid, or itaconic acid, and the Tg of the copolymer is below −15° C.

5. The method of claim 4 in which (1) is styrene, (2) is butyl acrylate, (3) is at least one of hydroxyethyl methacrylate and methacrylamide, and (4) is methacrylic acid, the respective relative amounts by weight of (1), (2), (3), and (4) are in the ranges 40–50/50–60/1–3/1–2, the total being from 92 to 115, and which composition contains a volatile tertiary amine.

6. The method of claim 5 in which a pigment is present, the relative weight of pigment to A plus B being from 5:95 to 60:40, the total being 100.

7. A shaped sheet metal article containing a cured coating having a thickness of 0.05 to 5 mils of a pigmented or unpigmented thermosettable composition adapted for direct-roller coating of metals comprising an alkaline aqueous blend having a binder consisting essentially of:

A. a latex of a water-insoluble addition copolymer obtained by emulsion polymerization having a molecular weight of from 250,000 to 1,000,000 of (1) a monovinyl aromatic monomer, (2) at least one ester of acrylic or methacrylic acid, (3) at least one olefinically unsaturated monomer having an amide or a hydroxyl group, and (4) an olefinically unsaturated monomer having a carboxyl group, the amount of (3) being from 1.5 to 5 percent and the amount of (4) being from .5 to 2 percent, based on the total weight of monomers, the Tg of the copolymer being below 0° C., and B. a water-soluble urea-formaldehyde reaction product or a water-soluble methanol or ethanol ether thereof, the weight ratio of A to B on a solids basis being from 35:65 to 65:35, the minimum film-forming temperature of the composition being no higher than about 15° C., and the solids content of the composition being between 40 and 80 percent.

8. The method of claim 1 in which (3) consists of a monomer having an amide group and said molecular weight is at least about 250,000.

9. The method of claim 1 in which (3) consists of a monomer having a hydroxyl group and said molecular weight is at least about 250,000.

10. The method of claim 5 in which (3) consists of hydroxyethyl methacrylate.

11. The method of claim 5 in which (3) is methacrylamide.

* * * * *

UNITED STATES PATENT AND TRADEMARK OFFICE
CERTIFICATE OF CORRECTION

PATENT NO. : 4,020,219
DATED : April 26, 1977
INVENTOR(S) : R. Martorano, W.H. Brendley, Jr., T. H. Haag It is certified that error appears in the above-identified patent and that said Letters Patent are hereby corrected as shown below:

In the abstract, line 11 "methanor" should be -- methanol --.

Column 1, line 29, "resistane" should be --resistance--.

Column 3, lines 26-29, should read as follows: --Examples of homopolymers and the inherent $T_g$ thereof which permits such calculations are as follows:--.

Column 3, line 57 after "toughening" insert --or--.

Column 6, line 37 "is" should be --in--.

Column 6, line 48 "along" should be --alone--.

Column 9, line 10 "catalysts" should be --catalysis--.

Column 9, line 49 "suprisingly" should be --surprisingly--.

Column 12, line 40, after "polymerization" insert --having--.

Signed and Sealed this sixteenth Day of August 1977

[SEAL]

Attest:

RUTH C. MASON
Attesting Officer

C. MARSHALL DANN
Commissioner of Patents and Trademarks